Dec. 18, 1962 G. K. HALL 3,068,747

FINDER FOR QUICKLY LOCATING A DESIRED ITEM IN A LONG LIST OF ITEMS

Filed Aug. 7, 1957 3 Sheets-Sheet 1

ADDENDUM

Davidson Sidney 10 Main TLO-0000

- - - - -

Doering Christopher 3 Main TLO-0000

INVENTOR.

Garrison K. Hall

BY

Roberts, Cushman & Grover

ATT'YS

Dec. 18, 1962 G. K. HALL 3,068,747

FINDER FOR QUICKLY LOCATING A DESIRED ITEM IN A LONG LIST OF ITEMS

Filed Aug. 7, 1957 3 Sheets-Sheet 2

Inventor
Garrison K. Hall
by Roberts, Cushman & Grover
Att'ys

Dec. 18, 1962 G. K. HALL 3,068,747

FINDER FOR QUICKLY LOCATING A DESIRED ITEM IN A LONG LIST OF ITEMS

Filed Aug. 7, 1957 3 Sheets-Sheet 3

INVENTOR.

BY Garrison K. Hall

Roberts, Cushman + Grove

ATT'YS 3,068,747

FINDER FOR QUICKLY LOCATING A DESIRED ITEM IN A LONG LIST OF ITEMS

Garrison K. Hall, 621 Country Way, North Scituate, Mass.

Filed Aug. 7, 1957, Ser. No. 676,807
9 Claims. (Cl. 88—24)

This invention pertains to a method of and apparatus for use in quickly selecting a desired item from among a large number of such items, for example but without limitation, for the quick location in a list of names, titles, data, or the like, of a particular one of such names, titles or datum. As a specific instance of the utility of said method and apparatus, the invention is herein described with particular reference to the problems encountered by the Information Operator in a telephone exchange whose work involves the rapid location of a name and phone number from a list of names which, in some instances, may exceed one million items.

Various devices and method of procedure have heretofore been proposed to facilitate the above operation, but none of these prior proposals is adequate for the purpose, particularly with reference to telephone exchanges which serve a large number of subscribers.

Moreover, even if such a list, once prepared, were permanent and unchanging, the location of the required name and number in a long directory involves a high degree of skill and manual dexterity; but the problem is further complicated by the fact that the listings are frequently changed, for instance in the New York Exchange, at a rate exceeding one thousand per week so that weekly relistings are required for use at the Information Desk. The present invention not only facilitates the rapid location of a required name in a long list, but also makes possible a similarly rapid location of names found only in such a weekly revision.

As herein illustrated, the finder comprises a list of an entire amount of items and an index list of items selected periodically from the total list together with means for viewing the lists and selector means for picking out a specific tiem from the index list, for example an index item under which the data sought for would be expected to be listed. The selector and index list are relatively movable with respect to the viewer so that the selected index item may be brought into the range of the viewer. Relative movement of the selector and index list is accompanied by movement of the total list at a relatively high speed to move that portion of it which comes under the index item selected on the index list into the range of its viewer. Preferably the speed of movement of the complete list is proportional to the ratio of the total listing to the index listing so that, that portion of the complete list containing the data sought for, is brought into the range of its viewer, substantially simultaneously with the selection of the index item on the index list. There may be an intermediate list or telltale list bearing a larger number of items than the index list and a smaller amount of items than the total list. When such a telltale list is employed selection of an index item on the index list effects movement of the telltale list at a slower speed than that of the total list so that an operator may pick out items thereon closer to that which is sought for than was shown on the index, for example, a pair of successive items between which the item sought for in the total list will lie. Movement of the pair of items on the telltale list into the range of its viewer is accompanied by movement of the total list so as to bring that portion of it located between these two items on the telltale list into the range of its viewer. Each of the lists may have several columns of items, dividing the total number of items equally, and there is means in the form of a carriage mounting the several lists for movement in unison so as to bring corresponding ones of the columns into the range of the viewers. The index list is fixed on the carriage with its entire length within the range of its viewer so that the entire index is visible at one time, while the telltale and total lists, which are much longer and only portions of which are visible at any given time, are movable on the carraige to bring other portions into view as controlled by the movement of the selector along the index. There may be a scale adjacent the index list dividing the latter up into an equal number of parts corresponding to the number of columns on the lists and means movable along the scale to effect movement of the lists relative to the viewers to bring corresponding ones of the columns into the range of the viewers. The lists herein shown are microfilms on which the items are printed and the viewers are projectors consisting of lenses and light sources for projecting the lists onto a screen. It is to be understood that other viewing means may be employed for this purpose without departing from the spirit of the invention.

Should a greater amount of data be required to be listed the number of lists and columns in the several lists may be increased. Since within such listings there are certain ones that are called for much more frequently than others, an auxiliary list is printed beside the index list containing the data more frequently called for, which data is projected on the screen beside the columns of that list. An addendum list is also provided for current changes in the list. This addendum list is divided into the same number of columns as the index list and is mounted so as to be projected with the index list on the screen.

The invention will now be described in greater detail with reference to the accompanying drawings wherein.

Figures 1, 5:
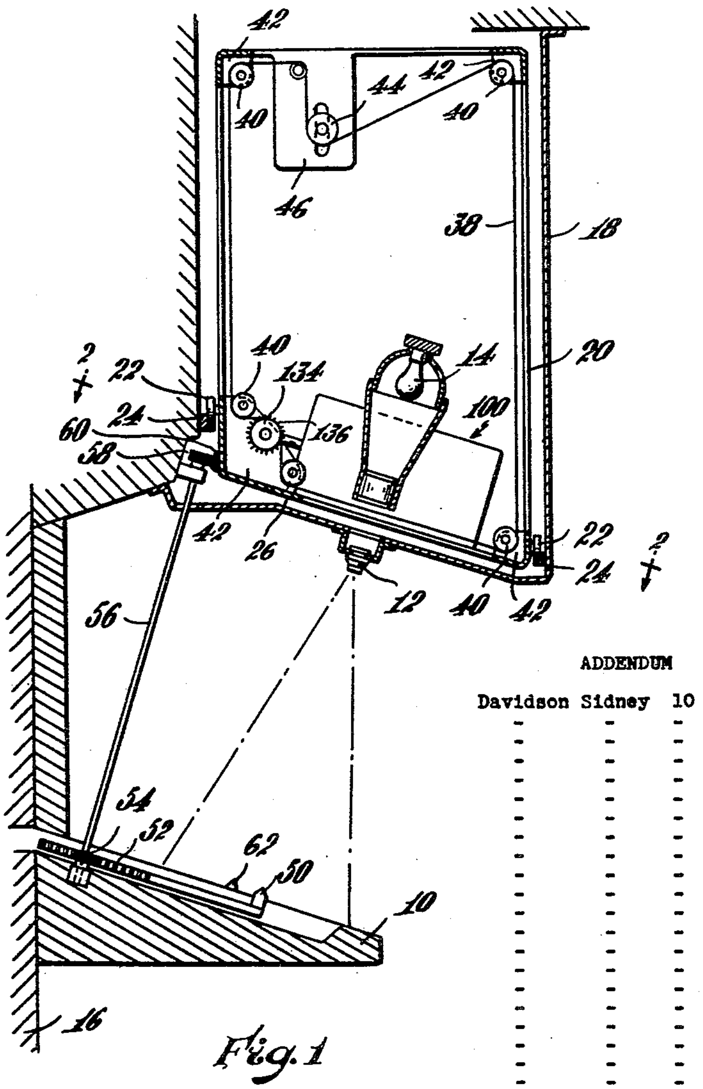
FIG. 1 is a vertical section through the apparatus which forms the subject matter of this invention.
FIG. 5 is a plan view of supplemental data which may be used in conjunction with the apparatus.
Figure 4:
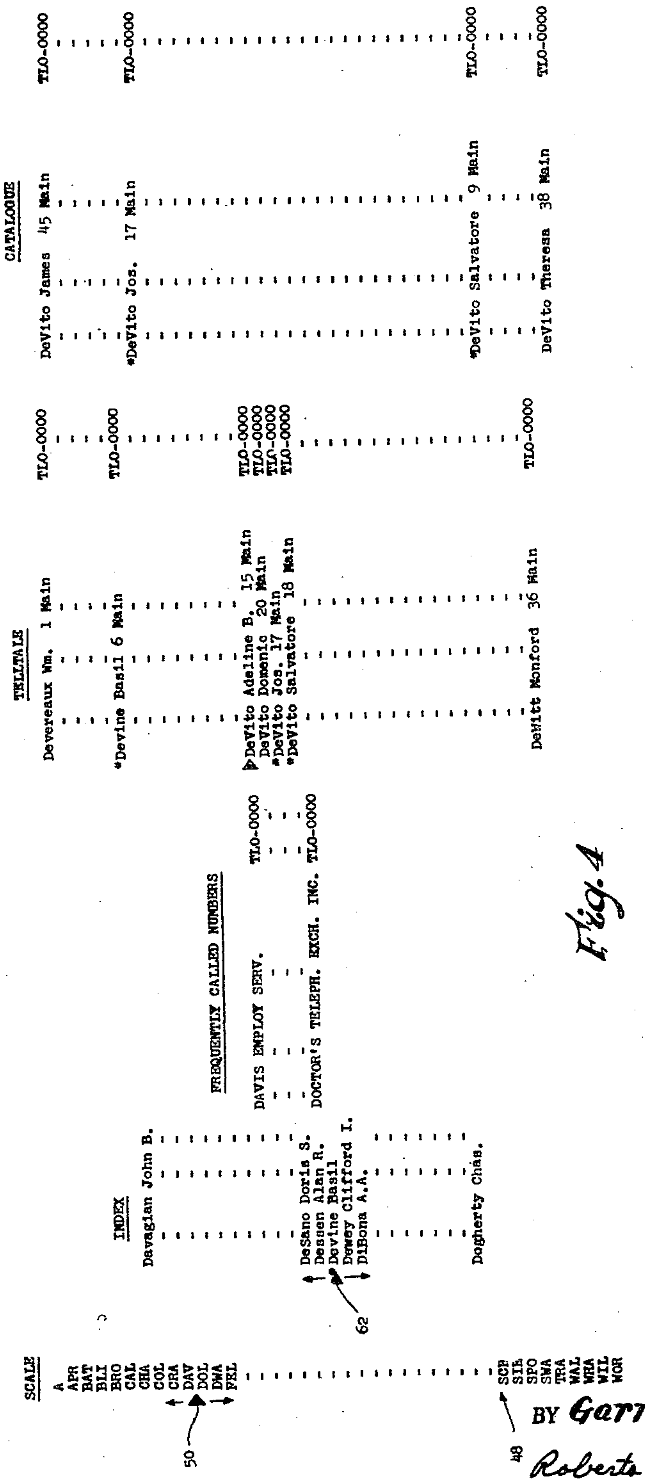
FIG. 4 is a plan view of the projected data as seen by the operator.

In FIG. 1, there is shown a bench 10 having an inclined surface upon which the information, sought for, is projected in enlarged form so as to be easily viewed by means of fixed projecting apparatus located perpendicularly above the inclined surface, there being three of such means spaced lengthwise of the bench, each of which includes a magnifying lens 12 and a light source 14. The several projectors are arranged in such fashion that the projected matter appears in spaced parallel columns on the inclined surface of the bench, as shown in FIG. 4, and in combination with the surface constitute viewers.

The bench 10 is preferably elevated from the floor and supported by suitable means from a wall 16 or from a cabinet specially constructed for this purpose. The lens and light source are mounted in a housing 18, fastened to the wall or ceiling or a part of the cabinet above the bench 10.

Figures 2, 3:
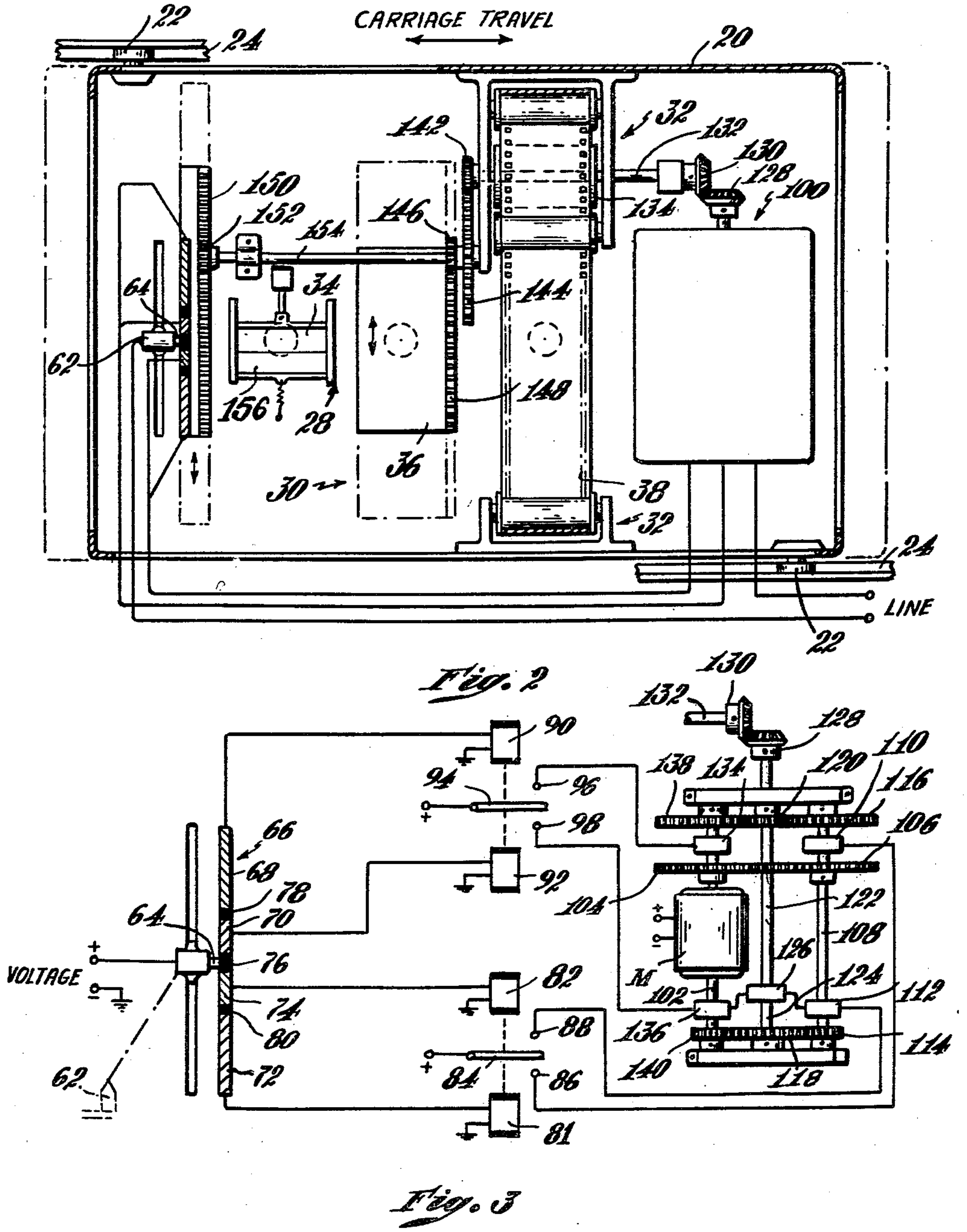
FIG. 2 is a horizontal section taken on the line 2—2 of FIG. 1.
FIG. 3 is a diagrammatic view of the electromechanical control.

Within the housing 18 there is located a carriage 20, which has at its front and back side near its lower end pairs of wheels 22 which rest on horizontally arranged tracks 24 and support the carriage within the housing for transverse movement in a horizontal plane relative to the bench, lenses and light sources, the length of such movement being shown in FIG. 2, by the dotted line at each end of the carriage. The bottom or lower wall 26 of the carriage is inclined so as to be parallel with the inclined surface of the bench and has openings in it across which microfilm strips, which will be described hereinafter, may be moved between the light sources and the lenses so that data carried by the microfilms will be projected onto the inclined surface of the bench.

The carriage 20 has mounted on it and movable with it three supports 28, 30 and 32, each of which is adapted to carry a length of microfilm 34, 36 and 38, bearing parallel columns of data, the data in each column being arranged in a definite sequence and the columns in each microfilm length dividing the total amount of data on that microfilm length into columns of substantially equal amount.

One of the purposes of the apparatus is to enable telephone operators quickly to find a given name in a directory where there are an exceedingly large number of names in the order, for example, of one million and where requests for information are frequent. Taking such a directory by way of example only, the content is reproduced on the aforesaid three microfilms lengths by suitable means in the following fashion. On film 38 the entire number of names in the directory are printed in alphabetical form as they appear in the directory, divided into 25 equal columns. The width and length of the film will depend somewhat upon the quantity of data which is to be printed thereon and the reduction in size of the original printing. The second microfilm 36 has printed on it data, periodically selected from the entire quantity of data so that it bears only a fraction of the entire amount of data that is printed on the film 38. Again, however, the entire amount of data on the second film 36 is arranged sequentially and in 25 columns of substantially equal quantity. For example, the second film may have printed on it every 25th listing in the directory and hence will have only every 25th listing which appears on the first microfilm 38. The third microfilm 34 also has a fractional amount of the total listing which is again divided up into 25 columns of equal length. In this instance, every 625th listing of the entire amount of data is printed on the film 34. As thus prepared it will at once be apparent that each of the listings on the third film 34 will also appear on the second and first films 36 and 38, there being however between these listings on the second film 36 a large number of listings not shown in the third film and on the first film a large number of listings not shown on the second film, for purposes which will appear hereinafter. Listings common to the first and second films are identified by an asterisk or other suitable mark on the first film beside that listing. Listings common to the second and third films are identified by an asterisk or other suitable mark on the second film beside that listing.

The microfilm 34, hereinafter referred to as the index list, bears a comparatively small amount of data and consequently is short enough from front to back so that its entire front to back width is within the range of the projector, and hence it need not be shifted from front to back. Accordingly, the index list is fixed in its support 28 on the carriage. The index list however, as related above, has 25 columns spaced from side edge to side edge and it is therefore necessary to move the carriage transversely to bring the desired column into the field of the projector.

The microfilm 36, hereinafter referred to as the telltale list, bears a much larger amount of data and hence is required to be moved from front to back to bring all portions of each column into the field of its projector as well as laterally to bring a given column into the field of the projector. Hence the support 30 for the telltale list is mounted so as to be movable on the carriage in a plane parallel to the inclined surface of the bench between the light source and the lens by an amount which is indicated in the dotted lines (FIG. 2).

The microfilm 38, hereinafter referred to as the total list, which bears all of the data, is much longer than the others and is herein shown in the form of an endless belt. Its support 32 consists of horizontally arranged spools 40 journaled in brackets 42 at the four corners of the carriage so that it can be moved lengthwise with reference to the projector as well as transversely thereof. In order to provide for varying the length of film a take-up spool 44 is mounted on a bracket 46 between the two upper spools which may be adjusted heightwise within the carriage. Optionally, sprockets may be substituted for the takeup spool 44 together with idlers for feeding a large quantity of film stored in the carriage housing in either direction.

On the bench 10 at the left-and side there is a scale 48 FIG. 4 of indicia which corresponds to the columns into which the entire amount of data is divided. This scale parallels the left-hand edge of the column projected onto the bench from the index list 34. A pointer 50 is slidably mounted on the bench for movement along this scale to pick out therefrom the column which contains an index item which is closest to the information being sought. Movement of the pointer is transmitted to the carriage, as illustrated by a rack 52 connected to the pointer, which engages a pinion 54 fast on one end of a shaft 56, the other end of which also carries a pinion 58 which engages a rack 60 fast to the carriage. Thus movement of the pointer along the scale to a given indicia will shift the carriage transversely to move all of the microfilms simultaneously, transversely with reference to their respective projectors to bring corresponding ones of the columns on each film list into the field of its projector. For example, if the pointer is moved to a place on the scale between the indicia DAV and DOL, the carriage will be shifted to bring the columns on the several lists which contain all listings between DAV and DOL into the range of the respective projectors.

There is also on the bench a second pointer 62 which is arranged to be moved along the left-hand margin of the selected column on the index list as projected on the surface of the bench to pick out from that column a specific index item which is more closely related to that which is sought for, than that which appeared on the scale. Movement of this pointer controls the longitudinal movement of the telltale list and the total list in their laterally shifted position to bring the proper portions of these columns containing the desired data into the field of the projectors.

For example, after having selected the column containing listings between DAV and DOL the second pointer 62 may be moved along the column to pick out an index item thereon which is even closer to that which is sought for, such as DEVINE. This in turn effects movement of the telltale list to bring all of the items thereon between DEVINE and DEWEY into the range of its viewer. By adjustment of the telltale list that portion of the list between DEVINE and DEWEY may be shifted to bring DeVITO into range, which in turn brings that portion of the total film into the range of its viewer which has listings of all of the DeVITO's thereon. Hence the operator can easily run down the list of DeVITO's to pick out the particular DeVITO wanted.

To obtain the desired movement of the telltale listing and total listing a brush 64 is suitably connected to the second pointer 62 and is movable thereby along a commutator bar 66 having four sections 68, 70, 72 and 74, divided from each other by insulation 76, 78 and 80. The two sections on either side of the centrally located insulator 76 are identical and provide for driving the film in opposite direction. The two lower commutator sections 72 and 74 are electrically connected respectively to two solenoids 81 and 82, which are arranged to shift a switch 84 located between them, between two contacts 86 and 88. The contact 88 provides for low speed operation and the contact 86 provides for high speed operation. Correspondingly, the two upper commutator sections 68 and 70 are electrically connected respectively to two solenoids 90 and 92, which are arranged to shift a switch 94 located between them, between two contacts 96 and 98. The contact 98 provides for low speed operation and the contact 96 provides for high speed operation.

The two sets of commutator blocks, solenoids, switches and contacts are provided to permit starting the apparatus slowly and then bringing it up to top speed and vice versa, without damage to the film.

The low and high speeds and reverse movement are obtained through a transmission 100 and a constantly driven motor M (FIG. 3). The motor M has a drive shaft 102 with portions projecting from each end. A large gear 104 is fast on this shaft and meshes with a gear 106 of corresponding size on a parallel shaft 108. The parallel shaft 108 has at opposite sides of the gear 106 solenoid operated clutches 110 and 112. The clutch 110 is energized by the high speed contact 86 and the clutch 112 is energized by the slow speed contact 88. The clutches 110 and 112 when actuated establish a drive from the shaft 108 to one or the other of two gears 114 and 116, in axial alignment therewith. The gears 114 and 116 mesh respectively with two other gears 118 and 120. The gear 120 is fixed on a third shaft 122 and the other gear 118 is fixed on a shaft 124 in axial alignment with the shaft 122 and may be drivably connected thereto by a solenoid operated clutch 126. The shaft 122 has on it a pinion 128 which meshes with another pinion 130 fast to a horizontally arranged shaft 132 on which there is a spool 134 carrying sprocket teeth 136 for driving the film 38. The shaft 132, as will be seen in FIG. 2, is journaled in the support means 32. When the switch 84 is shifted to the fast contact 86 the drive from the motor is through the gears 104, 106, clutch 110, gear 116 and 120 to shaft 122 and from shaft 122 through gears 128 and 130 to shaft 132. When the switch 84 is shifted to the slow contact 88 the drive is from the motor through the gears 104, 106, shaft 108, clutch 112, gears 114 and 118 and clutch 126 to the shaft 122 and from the shaft 122 through gears 128 and 130 to the shaft 132.

The motor shaft 102 is connected by way of clutches 134 and 136 to gears 138 and 140. Accordingly, when the switch 94 is moved to the slow contact 98, clutch 136 connects gears 140 to the motor shaft. The gear 140 through gear 118, clutch 126 and gear 128 drives the shaft 132. When the switch 94 is moved to the fast contact 96, clutch 134 connects gear 138 to the motor shaft. Gear 138 drives gear 120 which in turn drives gears 128 and 130.

The shaft 132 carrying the spool 134 which drives the film 38 has on it a small gear 142 which meshes with a large gear 144. The gear 144 has on its hub a small gear 146 which engages a rack 148 on the support 30 which carries the microfilm 36. The aforesaid train of gears reduces the speed at which the microfilm 36 is driven so that it travels at about 1/25 of the rate at which the microfilm 38 travels. At this slower speed it is possible for the operator to see the lines on the microfilm projector as it moves longitudinally with respect to the projector and thus enables the operator after it reaches that portion within which the data closest to that which is sought for is located, to make a closer adjustment by movement of the second pointer to bring a line or lines of data within that area even closer to what is sought for in the field and correspondingly to bring a portion of the film 38 still closer related to what is sought for into the range of its projector. If sprockets and idlers are substituted for the take-up spool 44, as suggested above, they can be driven by suitable connections to the spool 134 to drive the film in either direction.

To cause the first i.e., "total list" and second i.e., "telltale list" microfilms to follow very closely the movement of the pointer the commutator bar is movably mounted and movement is controlled by a rack 150 driven by a pinion 152 fast to a shaft 154, which in turn is driven by the gear 146. Thus as the film 36 moves up or down the commutator 66 moves in a corresponding direction so that as the selected portion of the film 36 moves into the field of the projector the commutator bar simultaneously moves relative to the pointer to bring the brush into engagement with one of the insulating blocks so that the drive is stopped and the films come to rest.

The aforesaid controls for driving the several films and thus positioning them in the field of their respective projector is illustrative of one way of securing the desired results, however, it is to be understood that other electrical and mechanical means may be employed for the same purpose and that the particular drive mechanism shown herein is not to be considered limiting in any sense.

There are of course some listings which are called for much more frequently than others; accordingly, these are divided into columns corresponding to the columns in the index list and printed on the microfilm beside the index columns, as shown in FIG. 4.

In a large city the listings change rapidly, for example, as much as a thousand a week; accordingly, to further facilitate finding the listing called for an addendum list, as shown in FIG. 5, and 156 of FIG. 2, of current changes, divided into the same number of columns as appear on the index list is mounted on the carriage in a manner to be swung into a position to be projected onto the screen below the index list. Thus if the operator fails to find the listing called for on the total list he may quickly swing the addendum list into position for examination.

The lists shown herein are printed on transparent films and movable between a light source and a magnifying lens for projection onto a screen. An opaque film may be employed with equal success by providing a suitable projector therefor. Moreover instead of using a projector a direct viewer may be employed. The apparatus is described herein with reference to its use for listing a telephone directory, however, it is equally useful for cataloging all types of material, for example, office records, library records of various books, statistical records and the like.

It should be understood that the present disclosure is for the purpose of illustration only and that this invention includes all modifications and equivalents which fall within the scope of the appended claims.

I claim:

1. A finder comprising three strips bearing lists of items arranged in lines in sequence, one strip bearing all of the items, the second strip bearing telltale items and the third strip bearing index items, said telltale and index items being selected at regularly spaced intervals from the total data, means mounting the strips for relative movement to bring specific portions of the second and third strips, which contain one of the index items, opposite the index item on the index strip, means for projecting an image of the index strip on a screen and portions of the telltale and total strips thereon side by side, a reference element movable along the screen adjacent the image of the index strip to pick out therefrom that index item which is closest to that sought for, follower means operable by the movement of the reference element to effect movement of the telltale strip to bring that portion of it bearing all of the items which are under the index item within the focus of the projector so that it appears on the screen, movement of said telltale strip being relatively slow so that a pair of successive items within that portion projected on the screen and between which the data sought for is located may be aligned with the center of the screen by adjustment of the reference element, said follower means operating simultaneously to effect movement of the complete strip at a relatively high speed to bring that portion of it located between the selected items on the telltale strip into the focus of its projector.

2. A finder comprising a strip bearing the complete list of a catalogue of items arranged in lines of definite sequence and divided into parallel columns, each column containing a substantially equal number of items, a second strip bearing a list of index items taken from the complete list of items at predetermined intervals so that the total number of items on the index list is only a fractional amount of the total number of items on the complete list, said index list also being arranged in sequence and divided into parallel columns corresponding in number to the columns on the complete list and each column containing a substantially equal number of items, a screen, projector means arranged opposite the screen, a carriage mounting the strips for movement in unison relative to the projector means to bring corresponding ones of the columns on the respective lists into the focus of the projector means so that images of said columns appear on the screen side by side, means mounting the strips on the carriage for relative movement to permit moving a portion of the catalog strip containing a given index item opposite the corresponding index item on the index strip, a reference element movable along the screen adjacent the image of the selected column of the index list on the screen to pick out an index item thereon which is closest to that sought for on the complete list, and follower means operable by movement of the reference element to effect movement of the catalog strip relative to the index strip at a speed such as to bring that portion of it contained under the index item into the focus of its projector for projection on the screen, substantially simultaneously with the movement of the selector to said index item.

3. A finder comprising strips bearing lists of data, each strip having a plurality of columns of data thereon dividing the total quantity of data on each strip into columns of substantially equal amount, one strip constituting an index and carrying periodically selected ones of the total quantity of data which constitutes a fraction of the total and another strip constituting a catalog and carrying the total quantity of the data, viewers corresponding in number to the strips, a carriage mounting the strips for movement in unison relative to the viewers to bring corresponding ones of the columns on the several strips into a position to be enlarged by the viewers, a scale of indicia corresponding in number to the number of columns into which the strips are divided, a reference pointer movable along the scale and operable to effect movement of the carriage to bring the selected columns into positions to be enlarged by their respective viewers, means for moving the catalog strip on the carriage relative to the index strip to bring a portion of the catalog strip containing an index item opposite the corresponding index item on the index strip, a reference element movable along the selected column of the one list to pick out the data thereon closest to that which is sought for, and follower mechanism operable by movement of the reference element to effect simultaneous movement of the catalog strip to bring that portion of the catalog strip containing the data opposite the reference element on the one list into a position to be enlarged by its viewer.

4. A finder comprising microfilm lists of data arranged in definite sequence, each microfilm list bearing a plurality of parallel columns of data dividing the total quantity of data of each microfilm list into columns of substantially equal amount, two of the microfilm lists carrying periodically selected ones of the total quantity of data which constitute fractional amounts of the total, one of the two carrying a smaller portion of the total than the other and a third microfilm list carrying the total quantity of data, reproducing means for reproducing the lists in magnified form, said means corresponding in number to the lists, a carriage for moving the three microfilms simultaneously in a transverse direction to bring corresponding columns of each into the focus of its reproducing means, means mounting the second and third microfilms for movement relative to the first to bring portions thereof containing given items opposite the corresponding item on the first microfilm, a reference element movable along the selected column on the first microfilm lists to select that line of data that is closest to that sought for, follower means operable by the reference element to move the second microfilm list lengthwise to bring within the focus of its reproducing means that portion of the data thereon within which may be found the line of data picked out from the first microfilm lists, said second microfilm list being further movable by adjustment of the last-named means to bring a line of data on the second microfilm list into a position which is even closer to that which is sought for and simultaneously to move the third microfilm list bearing the entire amount of data at a high speed and in a definite ratio to the movement of the second microfilm list to bring within the focus of its reproducing means that portion of the selected column which contains the data picked out of the second microfilm list.

5. A finder comprising a screen, a plurality of projection lenses and light sources arranged to project a corresponding number of images on the screen side by side, a carriage movable relative to the screen, lenses and light sources, microfilms mounted on the carriage for movement therewith relative to the lens and light sources, each microfilm having widthwise thereof a corresponding number of columns of data so that movement of the carriage effects movement of corresponding ones of the columns of each list into the range of its lens and light source, whereby corresponding columns of the several lists are projected onto the screen, a column selector for moving the carriage relative to the screen to bring the desired columns into the range of the projectors, a line selector movable along the column projected from the first microfilm on the screen, means mounting the second and third films for movement lengthwise on the carriage, a fixed reference adjacent an edge of the second microfilm as projected on the screen, said line selector being operable to effect movement of the second and third microfilms lengthwise, the second film at a relatively low speed and the third at a relatively high speed, and by adjustment between the lines of data on the projected image of the first film to line up datum on the projected portion of the second film with the fixed reference which is still closer to that sought for, and simultaneously to effect movement of the third microfilm at said relatively high speed to bring that portion of its selected column carrying the data within which the data sought for is located into a position with reference to its projector to be projected on the screen.

6. A finder according to claim 2, wherein each column on the index list has paralleling it auxiliary columns of data made up of data most frequently sought for in that column.

7. A finder according to claim 2, in which the index list has associated with it a supplementary list of current data divided into columns corresponding in number to the number of columns on the list.

8. A finder comprising a strip bearing a catalog of information listed in sequential order, a second strip bearing an index of the catalog of information containing indices under which specific portions of the catalog information can be found, said index also being arranged in sequential order, means mounting the catalog strip in parallel relation to the index strip for movement relative thereto, to bring a specific portion thereof, containing one of the index items, opposite the corresponding index item on the index strip, said last-named means including a spool and a shaft for effecting rotation of the spool, a reference element movable parallel to the index strip to pick out an item thereon, means for exhibiting the index strip and that portion of the catalog strip next to the index strip, and follower mechanism operable, by the movement of the reference element along the index strip, to effect movement of the catalog strip relative to the index strip at such a speed as to bring a portion of the catalog strip, containing a given index item, opposite the corresponding index item on the index strip substantially simultaneously with the movement of the reference element to said index item, said follower mechanism comprising a motor, means connecting the motor to said shaft operable to reverse the direction of rotation of the shaft, and means operable, by the reference element, to effect operation of said last-named means, the means connecting the motor to the drive shaft being shiftable to drive the shaft at low and high speed, and means operable, by the reference element, to effect shifting of said means to initiate rotation of the shaft at a low speed and thereafter to change it to high speed.

9. A finder comprising a catalog strip bearing a list of items arranged in lines of definite sequence and divided into parallel columns, each containing a substantially equal number of items, an index strip bearing items taken from the first list of items at periodic intervals so that the total number of items on the index strip is only a fractional amount of the total number of items on the total list, the index items also being arranged in sequence and divided into parallel columns corresponding in number to the columns of the total list and each column containing a substantially equal number of index items, means mounting the catalog strip and index strip parallel to each other for relative movement, said means including a drive shaft, a reference element movable parallel to the index strip, a viewer by means of which the reference element, catalog strip and index strip may be seen side-by-side in parallel relation to each other, and a follower mechanism operable, by such relative movement of the reference element and index strip, to effect movement of the catalog strip at a speed whose ratio to that of the relative movement of the reference element and index strip is substantially proportional to the ratio of the total number of items on the catalog strip to the number of items on the index strip, said follower mechanism comprising a motor, a transmission connecting the motor to said drive shaft, said transmission being operable to reverse the direction of rotation of the drive shaft and to change the speed of rotation of the drive shaft, and means operable, by the reference element, to effect operation of the transmission to reverse the rotation of the drive shaft and to change its speed of rotation.

References Cited in the file of this patent

UNITED STATES PATENTS

| | | |
|---|---|---|
| 1,889,575 | Sebille | Nov. 29, 1932 |
| 1,918,468 | Harding | July 18, 1933 |
| 1,988,162 | Chapman | Jan. 15, 1935 |
| 2,037,705 | Chapman | Apr. 21, 1936 |
| 2,076,853 | McClure | Apr. 13, 1937 |
| 2,323,372 | Bryce | July 6, 1943 |
| 2,431,662 | Ralph | Nov. 25, 1947 |
| 2,610,540 | Beitz | Sept. 16, 1952 |
| 2,685,227 | Brietzke | Aug. 3, 1954 |
| 2,735,334 | Emery et al. | Feb. 21, 1956 |

FOREIGN PATENTS

| | | |
|---|---|---|
| 1,001,921 | France | Oct. 31, 1951 |